(12) United States Patent
Ide

(10) Patent No.: US 7,349,132 B2
(45) Date of Patent: Mar. 25, 2008

(54) IMAGE READING APPARATUS

(75) Inventor: Naoaki Ide, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 997 days.

(21) Appl. No.: 10/354,042

(22) Filed: Jan. 30, 2003

(65) Prior Publication Data
US 2004/0160650 A1 Aug. 19, 2004

(51) Int. Cl.
H04N 1/04 (2006.01)

(52) U.S. Cl. ............... 358/474; 358/475; 358/509; 358/512; 382/274; 382/275

(58) Field of Classification Search ......... 358/474, 358/495, 509, 482, 505, 513, 514, 486, 475, 358/501, 504, 515, 516, 520, 446, 461; 382/274, 382/275
See application file for complete search history.

(56) References Cited

U.S. PATENT DOCUMENTS

| | | | | |
|---|---|---|---|---|
| 4,359,670 A * | 11/1982 | Hosaka et al. | ............ | 315/307 |
| 4,679,073 A * | 7/1987 | Hayashi | ............ | 358/516 |
| 4,888,492 A * | 12/1989 | Arimoto | ............ | 358/448 |
| 5,210,600 A * | 5/1993 | Hirata | ............ | 358/527 |
| 5,347,375 A * | 9/1994 | Saito et al. | ............ | 359/9 |
| 5,367,223 A * | 11/1994 | Eccher | ............ | 315/97 |
| 5,530,239 A * | 6/1996 | Konishi et al. | ............ | 250/208.1 |
| 5,813,987 A * | 9/1998 | Modell et al. | ............ | 600/473 |
| 6,330,083 B1 * | 12/2001 | Nabeshima et al. | ............ | 358/474 |
| 6,627,863 B2 * | 9/2003 | Wasserman | ............ | 250/205 |
| 6,650,443 B1 * | 11/2003 | Izumi | ............ | 358/475 |
| 6,806,980 B2 * | 10/2004 | Xu et al. | ............ | 358/474 |
| 6,960,759 B2 * | 11/2005 | Konagaya | ............ | 250/238 |
| 7,023,589 B2 * | 4/2006 | Yamaguchi | ............ | 358/487 |
| 7,202,980 B2 * | 4/2007 | Hayashi | ............ | 358/475 |
| 2002/0074480 A1 * | 6/2002 | Wasserman | ............ | 250/205 |

FOREIGN PATENT DOCUMENTS

| | | |
|---|---|---|
| JP | 5-93161 U | 12/1993 |
| JP | 2001-144907 A | 5/2001 |

* cited by examiner

Primary Examiner—Aung S. Moe
Assistant Examiner—Negussie Worku
(74) Attorney, Agent, or Firm—Foley & Lardner LLP

(57) ABSTRACT

An image reading unit according to the present invention includes a lamp to incorporate a change in temperature conditions to the emitting light amount, the lamp capable of illuminating an reading object with a light of a predetermined intensity, an image signal generation unit which generates an image signal corresponding to the reflected light generated when a reading object is illuminated, and a cooling unit which cools a predetermined range of the lamp, so that the intensity change in the light radiated from the lamp of the illumination unit, in the length direction of the illumination unit can be suppressed.

9 Claims, 8 Drawing Sheets

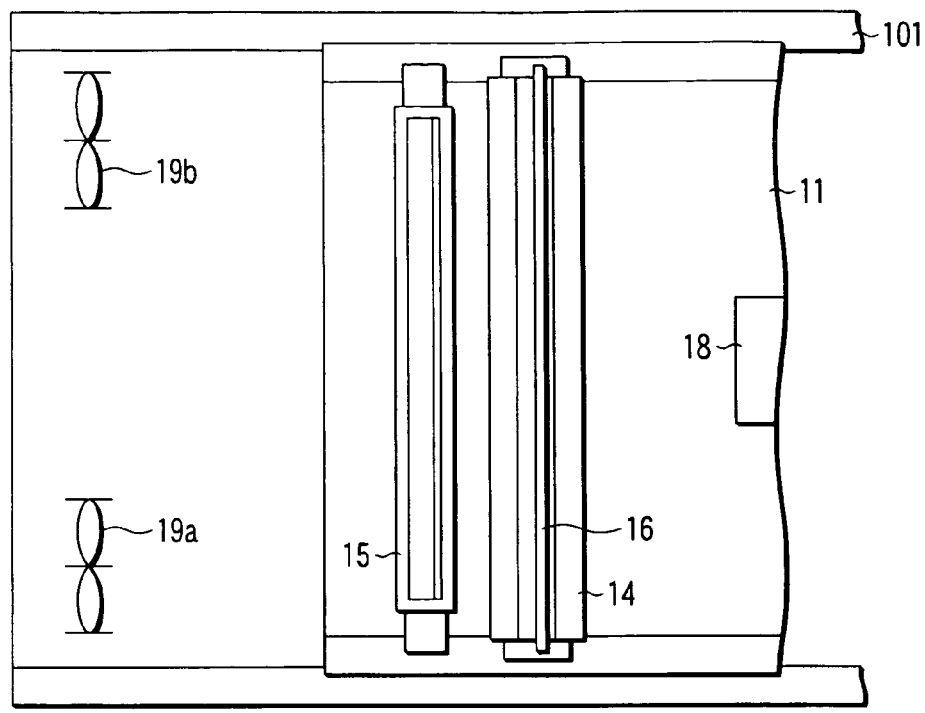
F I G. 2A
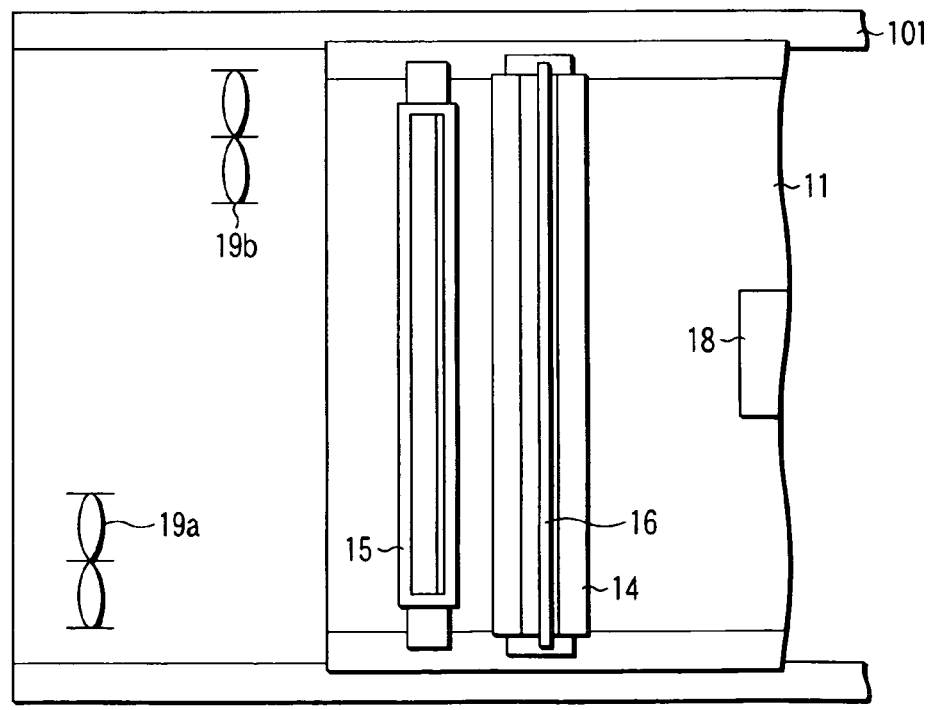
F I G. 2B

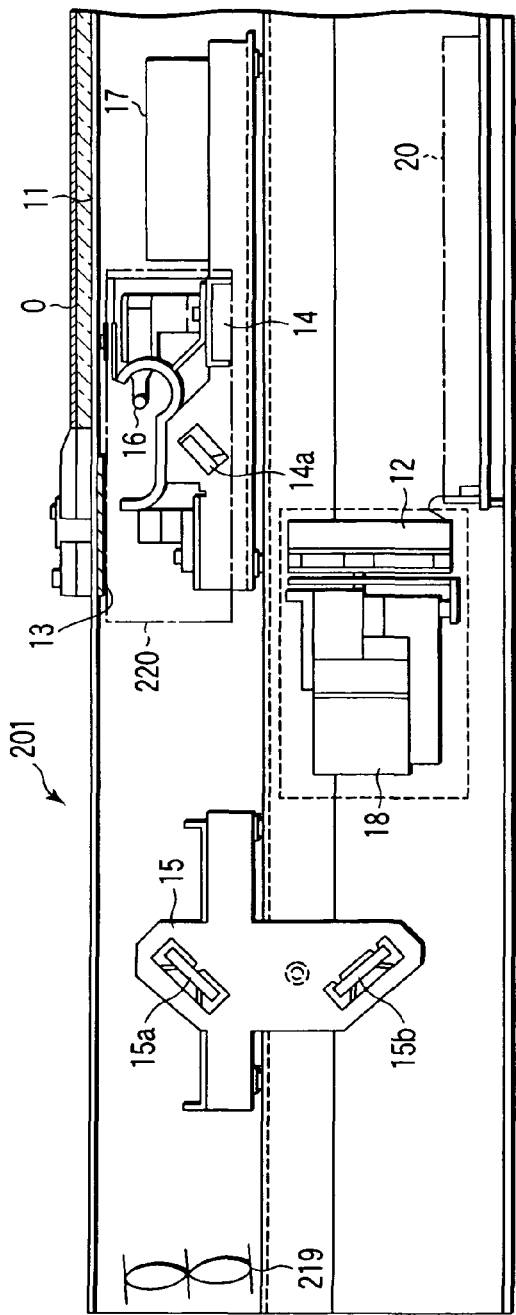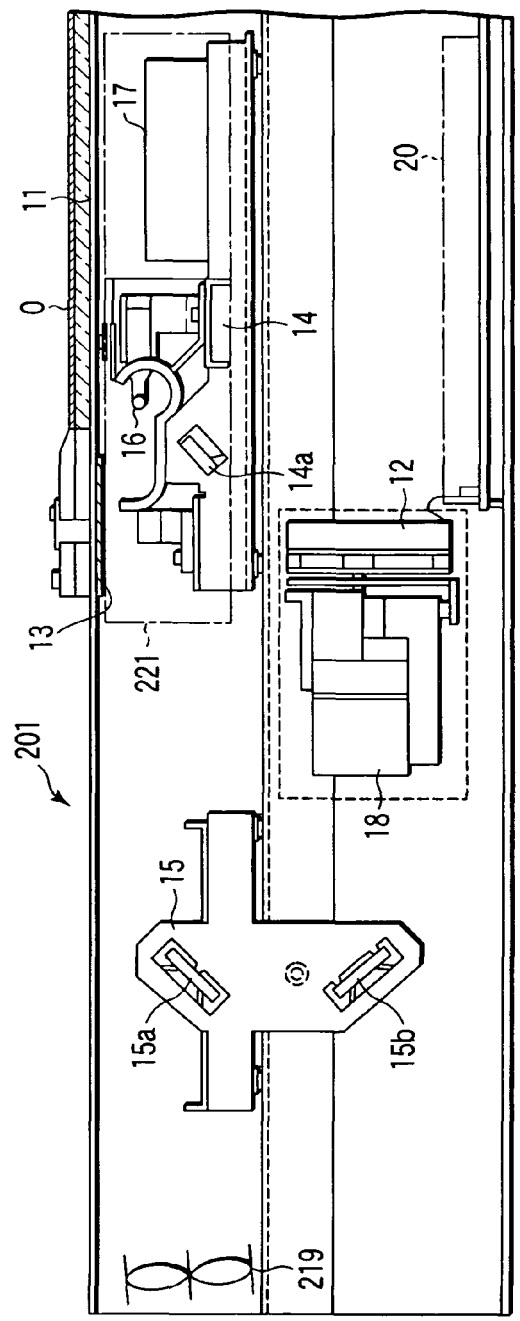
FIG. 8A
FIG. 8B

IMAGE READING APPARATUS

BACKGROUND OF THE INVENTION

The present invention relates to an image reading apparatus for obtaining image data for an electro-photographic image forming apparatus, for example, and an image forming apparatus having the image reading apparatus.

An image reading apparatus or a scanner converts a reflected light obtained by lighting a reading object such as a sheet-like document, book and three-dimensional object, by an image reading sensor such as a CCD sensor, and outputs the image data.

In many cases, in an image reading apparatus, a reflected light from a reading object is transmitted to a CCD sensor (illuminated by an illumination unit), by moving an optical element set including an illumination unit and mirrors along a glass plate, while remaining a reading object standstill at a predetermined position in a document holding unit (a transparent glass plate).

An illumination unit has a tubular exposing lamp formed to be able to illuminate the reading width that is defined as a total length of an optional one side of a transparent glass plate of a document holding unit.

For example, in a scanner using a halogen lamp as an exposing lamp, a fan is required for cooling a glass plate or a document holding unit, a marker plate which provides a white reference for shading correction, and the inside of a scanner. In a scanner using a xenon lamp or a cold cathode-ray tube with small amount of heat, a cooling fan is not necessarily required.

Although a lamp with small amount of heat such as a xenon lamp is used, a higher illuminance is required to meet an apparatus with a high reading speed (and image forming speed) or a color copying apparatus, and the lamp is heated to a high temperature. In a case where a specific position in a document holding unit is illuminated like in a sheet-through system, the temperature of the document holding unit rises high, and cooling is necessary.

Cooling or ventilation with a fan is necessary also to prevent adhesion of dust to mirrors or the glass surface.

It is known that a lamp represented by a xenon lamp with a phosphor applied to the inside of a tube changes in the light-emitting efficiency of the phosphor, when the temperature in the tube changes. Particularly, when the temperature in the tube is lowered by cooling, the light-emitting efficiency increases and the output light quantity increases. Thus, when a fan is mounted simply for cooling, the luminance at an optional position in the reading width defined in a document holding unit changes in the length direction of the lamp depending on the direction and amount of the wind from the fan.

When illuminance varies in the reading width of a document holding unit, the image quality (level) of an image to be read lowers. The S/N ratio of an image signal outputted from a CCD sensor is deteriorated, and/or variations occur in the shading correction.

BRIEF SUMMARY OF THE INVENTION

It is an object of the present invention is to improve the image quality of the image information obtained by an image reading sensor, by optimizing the distribution of the light radiated from a lamp of an illumination unit in the length direction of the illumination unit.

According to an aspect of the present invention, there is provided an image reading apparatus comprising an illumination unit including a lamp to incorporate a change in temperature conditions to the emitting light amount, the lamp extending in a predetermined direction and having a predetermined length, the lamp illuminating a reading object with a light of a predetermined intensity; an image signal generation unit which generates an image signal corresponding to a reflected light based on the reflected light generated when the reading object is illuminated; and a light intensity setting unit (a cooling unit) which can set a change in the intensity of the light radiated from the illumination unit within a predetermined range in the length direction of the illumination unit.

According to another aspect of the present invention, there is provided an image reading apparatus comprising an illumination unit including a lamp to incorporate a change in temperature conditions to the emitting light amount, the lamp extending in a predetermined direction and having a predetermined length, the lamp illuminating a reading object to obtain the reflected light from the reading object; a first control unit which changes the capacity of the lamp of the illumination unit to illuminate the reading object; an image signal generation unit which generates an image signal by opto-electrically converting the reflected light; an optical unit which inputs the reflected light to the image signal generation unit; a second control unit which operates the image signal generation unit; a white reference marker which provides a reference for shading correction and illuminance of an illumination light to illuminate the reading object; an image processing unit which compensates a fluctuation in an image signal caused by any one of or all of the image signal generation unit, the illumination unit and the optical unit, and performs shading correction of the output of the image signal generation unit to set a reference for the output level of the image signal generation unit; a cooling unit which cools the lamp of the illumination unit; a third control unit which operates the cooling unit; and a control amount setting unit which sets the cooling amount when operating the cooling unit by the third control unit, and gives an instruction to the third control unit.

According to still another aspect of the present invention, there is provided an image reading apparatus comprising an illumination unit including a lamp to incorporate a change in temperature conditions to the emitting light amount, the lamp extending in a predetermined direction and having the distribution of the emitting light amount in the length direction, the lamp illuminating a reading object to obtain the reflected light from the reading object; a lamp lighting circuit which changes the capacity of the lamp of the illumination unit to illuminate the reading object; a line CCD sensor which generates an image signal by opto-electrically changing the reflected light; an optical unit which transmits the reflected light to the light receiving surface of the line CCD sensor; a CCD sensor driving unit which operates the line CCD sensor; a white reference marker which provides a reference for shading correction and illuminance of an illumination light to illuminate the reading object; an image processing unit which compensates a fluctuation in an image signal caused by any one of or all of the line CCD sensor, the illumination unit and the optical unit, and performs shading correction of the output of the line CCD sensor to set a reference for the output level of the line CCD sensor; a cooling fan which generates a cooling wind for cooling the lamp of the illumination unit; an illuminance comparing unit which compares the image signal outputted from both ends in the length direction of the line CCD sensor and the image signal outputted from the part close to the center in the length direction of the line CCD sensor, among the reflected lights obtained when the white reference marker is illuminated by the lamp, and sets the wind amount of the cooling wind to be outputted by the cooling fan; a motor driving unit which operates the cooling fan; and a control amount setting unit which sets a value to be instructed to the motor driving unit, to achieve the wind amount of the cooling wind to be outputted by the cooling fan.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a schematic diagram explaining a layout of cooling fans in the image reading apparatus shown in FIG. 1;

FIG. 2B is a schematic diagram explaining another layout of cooling fans in the image reading apparatus shown in FIG. 1;

FIGS. 8A and 8B are schematic diagrams explaining an example of another embodiment for cooling the illumination lamp in the image reading apparatus shown in FIG. 1;

DETAILED DESCRIPTION OF THE INVENTION

Hereinafter, an image reading apparatus to which an embodiment of the present invention is applicable, and an example of an image forming apparatus in which the image reading apparatus is incorporated, will be explained with reference to the accompanying drawings. An embodiment will be explained taking an example of a digital copier.

Figure 1:
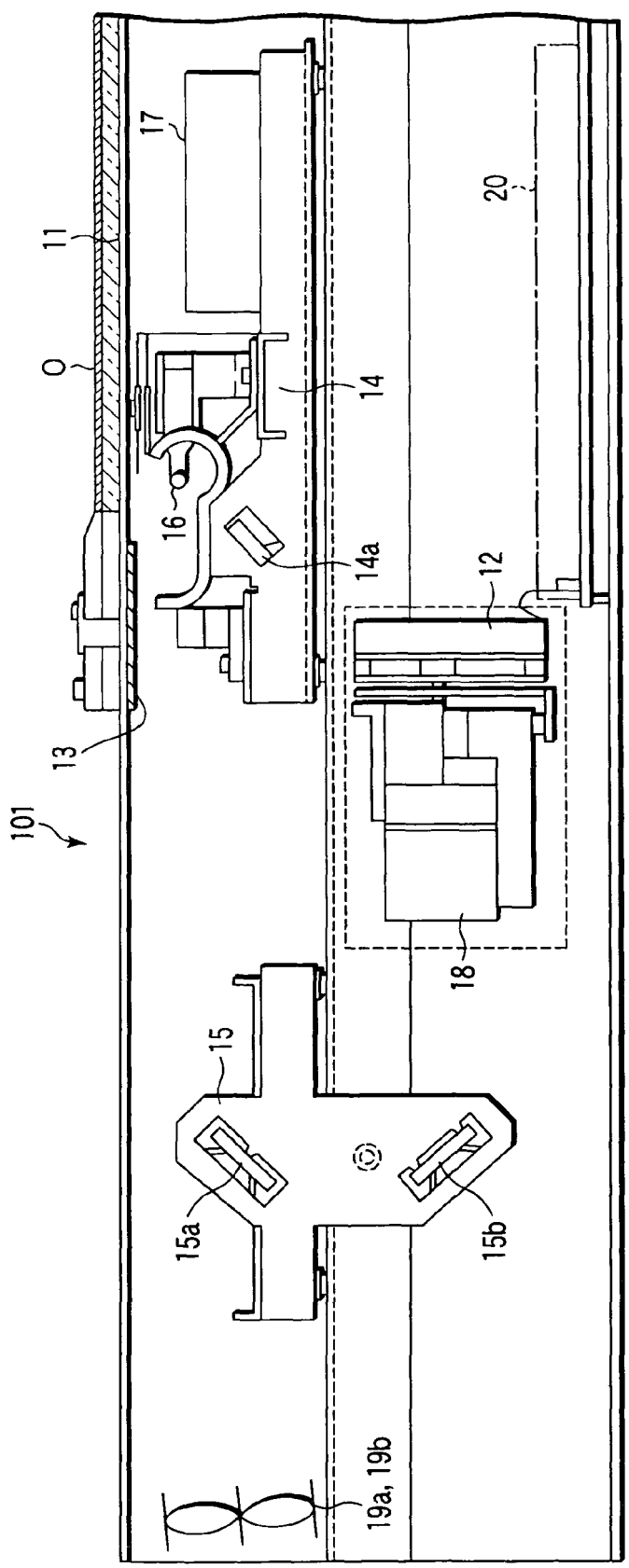
FIG. 1 is a schematic diagram explaining an example of an image reading apparatus according to the present invention.

As shown in FIG. 1, an image reading apparatus (a scanner) 101 has a document table 11, which is made of optically transparent material represented by a glass, and formed like a transparent plate with the substantially uniform thickness.

Below the document table 11, at a predetermined position in the image reading apparatus, a CCD sensor 12 which converts the image information of a reading object O into an electric signal (an image signal), is provided. The output from the CCD sensor 12 is applied to an image processor circuit board 20.

At a predetermined position close to one side of the document table 11, a white reference marker (a white reference plate) 13 is provided to set a white reference value of the CCD sensor 12, and to control the distribution of illuminance at the reading position of the reading object O set on the document table 11.

In the space under the document table 11, first and second carriages 14 and 15 are provided.

At predetermined positions in the first carriage 14, an illumination lamp (an exposing unit) 16 which illuminates the reading object O placed on the document table 11, an image light take-out mirror 14a which guides the light reflected from the reading object O illuminated by the light from the illumination lamp 16, that is, the image light in a predetermined direction, and a lamp lighting circuit (an exposure control circuit) 17 which lights the illumination lamp 16 so that it can radiate a light with a predetermined intensity. The illumination lamp 16 is replaceable by a xenon lamp or a cold cathode-ray tube, for example.

In the second carriage 15, first and second mirrors 15a and 15b are provided to guide the image light reflected from the image take-out mirror 14a toward the CCD sensor 12.

Between the second carriage 15 and the CCD sensor 12, a lens 18 is provided to give a predetermined optical characteristics and an image-forming magnification to the image light, which is reflected by the second mirror 15b and guided to the CCD sensor 12.

Under the document table 11, at the position capable of supplying an air current to the first and second carriages 14, 15 and the document table 11, first and second cooling fans (flat cooling mechanism) 19a and 19b are provided.

The fans 19a and 19b are arranged with a predetermined distance in the direction along the length direction of the illumination lamp 16, as shown in FIG. 2A. The fans 19a and 19b may also be arranged with difference distances from the lamp 16, according to the space saved between the illumination lamp 16, in the state viewed from the plane direction of the document table 11, as shown in FIG. 2B.

Figure 3:
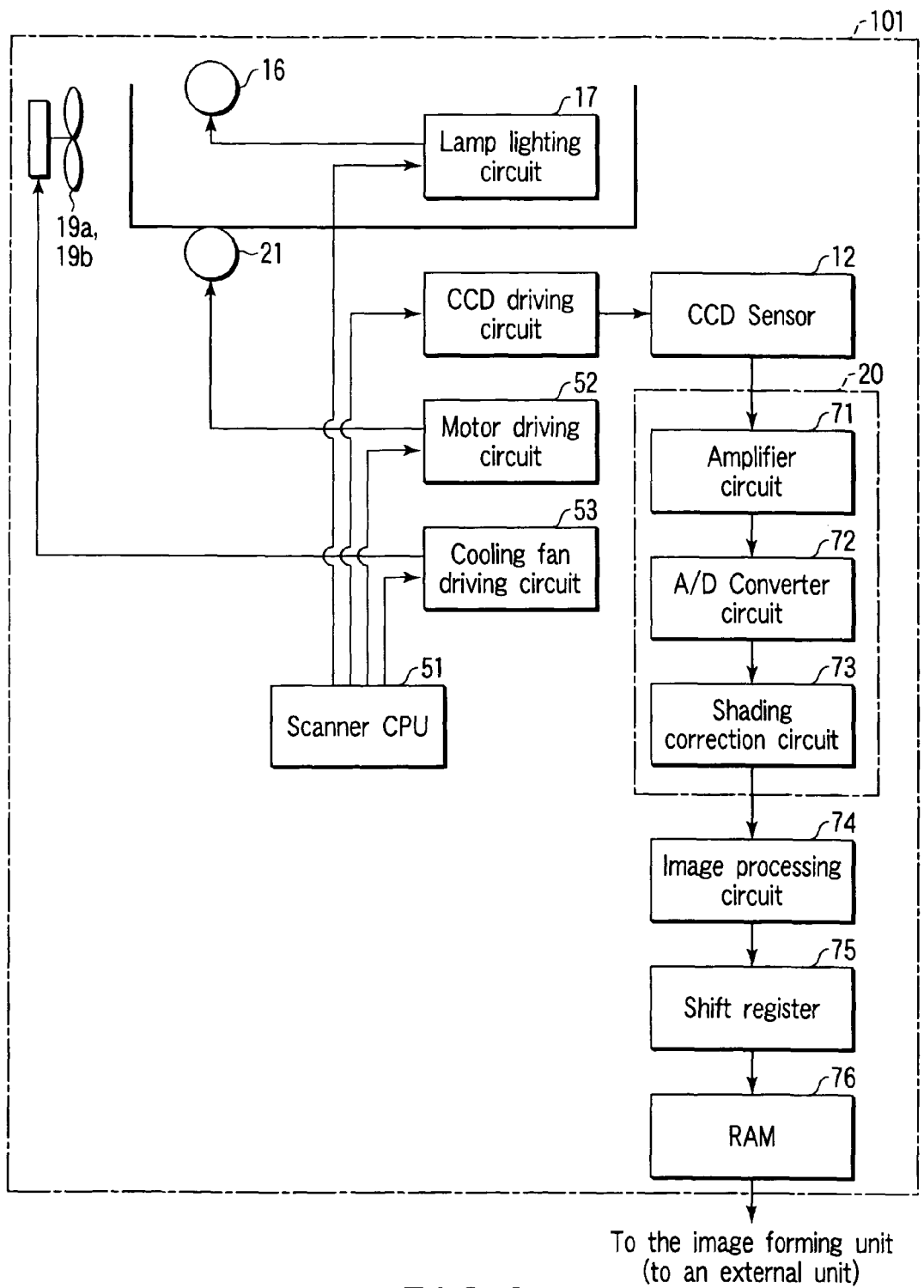
FIG. 3 is a block diagram explaining a signal processing system and a driving control system incorporated in the scanner shown in FIG. 1.

FIG. 3 is a block diagram explaining a signal processing system and a driving control system incorporated in the scanner shown in FIG. 1.

In the scanner 101 shown in FIG. 1, the first and second carriages 14 and 15 are moved by the rotation of a driving motor 21, to a home position not described in detail, or a position where at least the white reference marker 13 can be illuminated by the light from the illumination lamp 16. Therefore, the output of the CCD sensor 12 corresponds to the intensity of the reflected light from the white reference marker 13.

Since the white reference marker 13 is usually controlled with a predetermined range of brightness (color and density), reflectivity and surfaceness (diffuse reflection) over all areas illuminated by the light from illumination lamp 16, when the output of the CCD sensor 12 is not flat, it is seen that one of the factors, such as the output level of each pixel of the CCD sensor 12 (the conversion efficiency), uneven lighting of the lamp 16, out of the optical axis on the lens 18 or out of position of the lens, and stains in the image take-out mirror 14a, first and second mirrors 15a, 15b, and document table 11, is deviated from the allowable reference value or the set value by more than the specified value.

The CCD sensor 12 is a line sensor in which 7,500 pixels are arranged like a straight line. The sensitivity of each pixel of the CCD sensor is not constant, and has intrinsic variations.

The intensity of the light radiated from the illumination lamp 16 is also not constant in the length direction (the orientation distribution or the deviation in the light intensity in the length direction of the lamp is different for each lamp, and controlled as an individual difference).

The lens 18 has the characteristic that when the enlarging angle viewed from the center of the lens 18 is assumed to be $\theta$, the intensity of the light passing through the lens 18 is decreased proportional to $\cos^4\theta$. Therefore, when the intensity of the light radiated from the illumination lamp 16 is uniform over all areas in the length direction of the illumination lamp 16, the intensity of the light passing through the periphery of the lens 18 is decreased.

Because of these factors, in many cases, even if the image of the reading object O is substantially equal in the image density along the length direction of the illumination lamp 16, the density level of the image signal outputted from the CCD sensor 12 is not necessarily reproduced evenly along the length direction of the illumination lamp 16.

Thus, before the image of the reading object O is inputted into the individual pixels of the CCD sensor 12, the sensitivity of each pixel of the CCD sensor 12 is corrected. Namely, the sensitivity of the CCD sensor 12 is calibrated based on the black reference image (lamp off) and white reference image (white reference marker).

Assuming that k is a coefficient (magnification), S is an image signal before correction, B is black data and W is white data, based on the previously read black data or the output of the CCD sensor 12 when the illumination lamp 16 is off, and the white data or the output of the CCD sensor 12 against the reflected light from the white reference marker 13, for example, calculate the correction value I by the equation $I=k\{(S-B)/(W-B)\}$, whereby the shading of the output signal from the CCD sensor 12 is corrected.

More particularly, the white reference marker reading signal outputted from the CCD sensor 12 is amplified to a predetermined level by an amplifier circuit 71 in the image processor circuit board 20, and applied to an A/D converter circuit 72, where the signal is converted from analog to digital.

The A/D converted white reference marker reading signal is corrected in the shading, based on the above-mentioned black data, by calculating the correction value I in the shading correction circuit 73.

As explained above, the illumination lamp 16 is a xenon lamp or a cold cathode-ray tube, and the amount of the illumination light radiated from the part cooled by the cooling fans 19a and 19b is increases compared with the illumination lights from the other parts.

Figure 4:
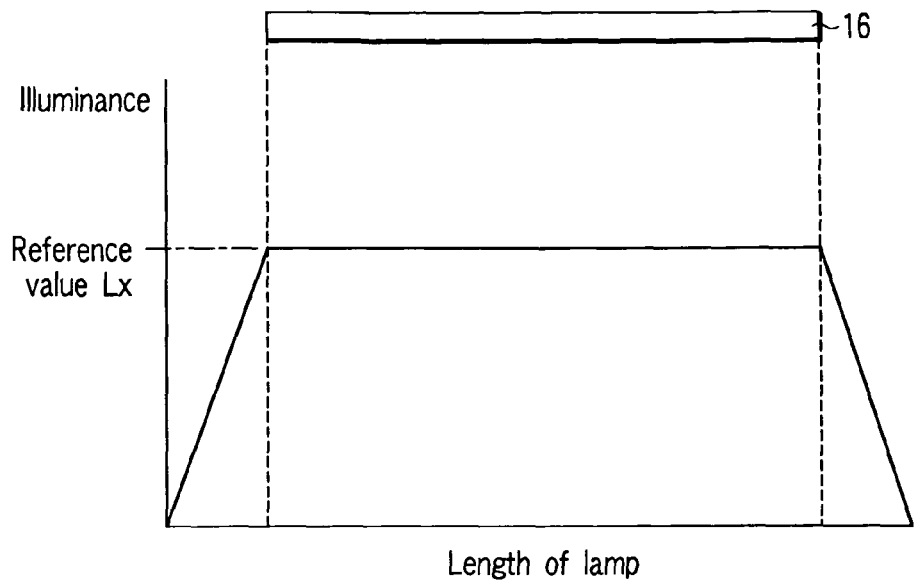
FIG. 4 is a view explaining the orientation characteristic of an illumination lamp in the length direction, when cooling is not performed.
Figure 5:
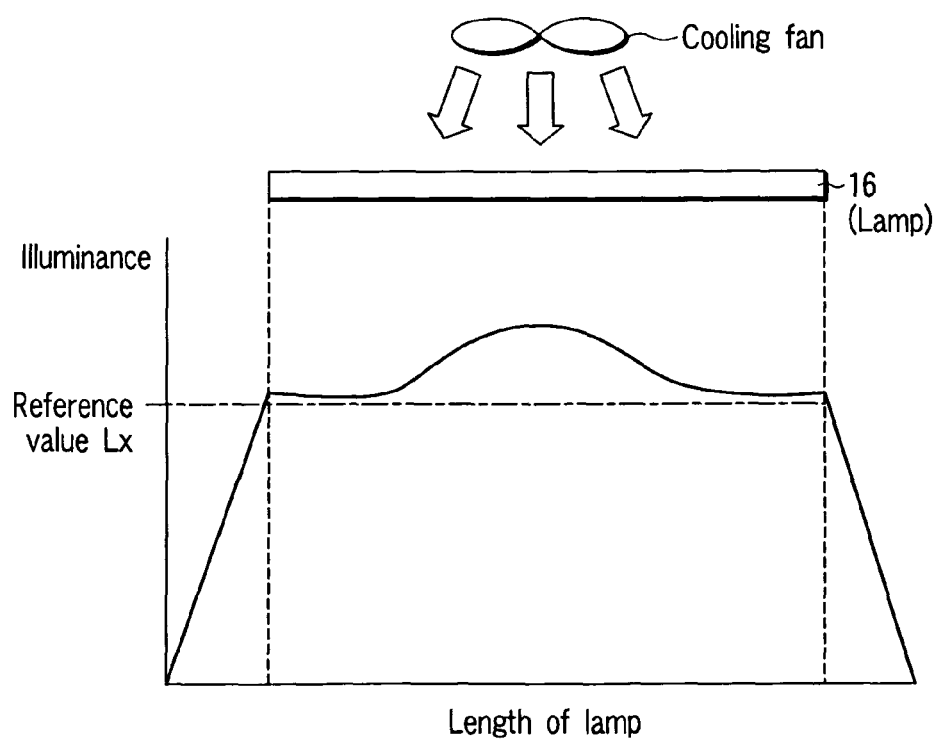
FIG. 5 is a view explaining the changes in the orientation characteristic of the light outputted from the illumination lamp, when the illumination lamp which can output the light of the orientation characteristic shown in FIG. 4 is cooled only at the part close to the center in the length direction.

For example, when the cooling fans 19a and 19b are not provided, the illumination light radiated from the illumination lamp 16 has the flat orientation characteristic all over the length direction, as shown in FIG. 4, and only the part close to the center of the lamp 16 is cooled by a fan, the illuminance at the part close to the center of the document table 11 is increased to be larger than the reference value Lx, as shown in FIG. 5. FIGS. 4 and 5 graphically shows the changes in the illuminance on the document table 11, expressing the distance in the length direction of the illumination lamp 16 along the horizontal axis, and the intensity of the illumination light radiated from the lamp 16 along the vertical axis. As to the orientation in the length direction of the illumination lamp 16, there is a type in which the light amount at both ends is set higher or lower than that at the center, but it is needless to say that the amount of the light radiated from a cooled part is larger than those radiated from the other parts.

Accordingly, as to the illumination lamp 16 having the orientation characteristic shown in FIG. 4, the output of the CCD sensor 12 can be made flat all over the length direction, by increasing the amplitude against the output signal from the parts (the output of the CCD sensor 12) with lower illuminance on the document table 11.

However, in this method, the noise level is also amplified at the ends of the CCD sensor 12, and the S/N ratio is deteriorated. That is, if the output difference between the ends and the center is double, the noise level is also doubled.

Further, when the light amount at the part close to the center in the length direction of the illumination lamp 16 is extremely increased by the cooling, there arises another problem that the output at the part close to the center of the CCD sensor 12 is saturated. In this case, the shading correction becomes incomplete (the correction limit is exceeded), and the image signal becomes defective (an opaque defect occurs in the output image).

Figure 6:
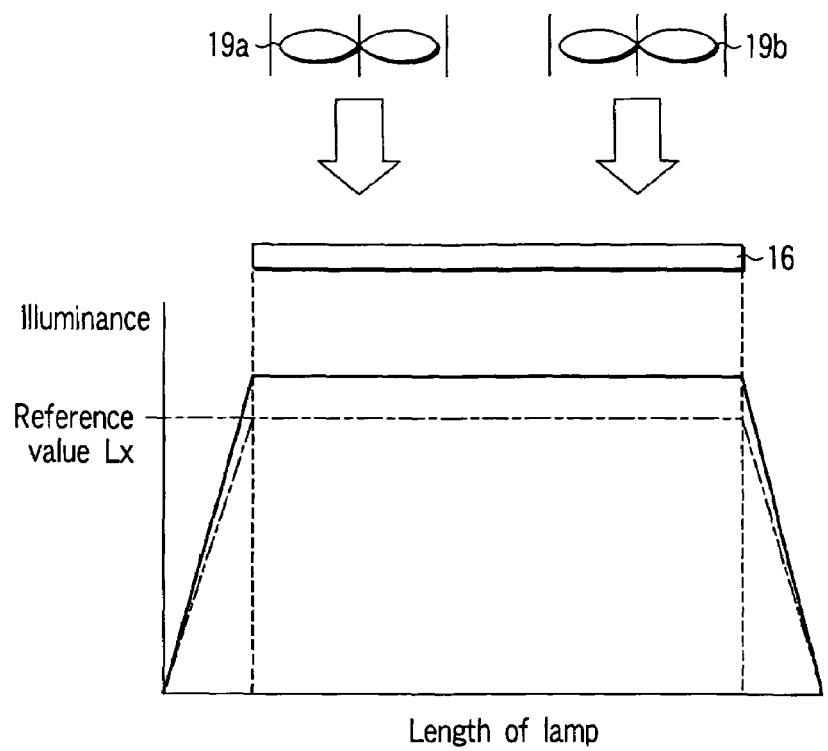
FIGS. 6 and 7 are views explaining an illuminance distribution on a document table achieved by cooling with two cooling fans arranged as explained in FIG. 2A or 2B.

Thus, as explained before with reference to FIG. 2A, the first and second fans 19a and 19b are provided at both ends or close to the both ends in the length direction of the illumination lamp 16, and by the control of a scanner CPU 51, a predetermined value (a voltage or the number of pulse corresponding to the number of rotation) is instructed to a cooling fan driving circuit 53 to control the amount of the cooling wind provided from each fan to the illumination lamp 16, so that the white reference marker reading signal outputted from the CCD sensor 12 becomes substantially equal over all areas in the length direction of the illumination lamp 16. By this instruction, the cooling fans 19a and 19b are driven at predetermined speeds to supply a predetermined amount of cooling wind to the illumination lamp 16, and the illuminance on the document table 11 is made substantially equal in all parts in the length direction of the illumination lamp 16, as shown in FIG. 6, at a level $L_1$ a little higher than the reference value Lx shown in FIGS. 4 and 5.

Owing to the structural feature of the scanner 101, as explained before with reference to FIG. 2B, there may be the case where the distance from the first and second cooling fans 19a and 19b to the illumination lamp 16 is not the same.

In this case, a predetermined value (a voltage or the number of pulse corresponding to the number of rotation) is instructed to the cooling fan driving circuit 53 independently for each of the fans 19a and 19b, so that the white reference marker reading signal outputted from the CCD sensor 12 becomes substantially equal over all areas in the length direction of the illumination lamp 16, according to the distance from the lamps 19a and 19b to the illumination lamp 16.

Figure 7:
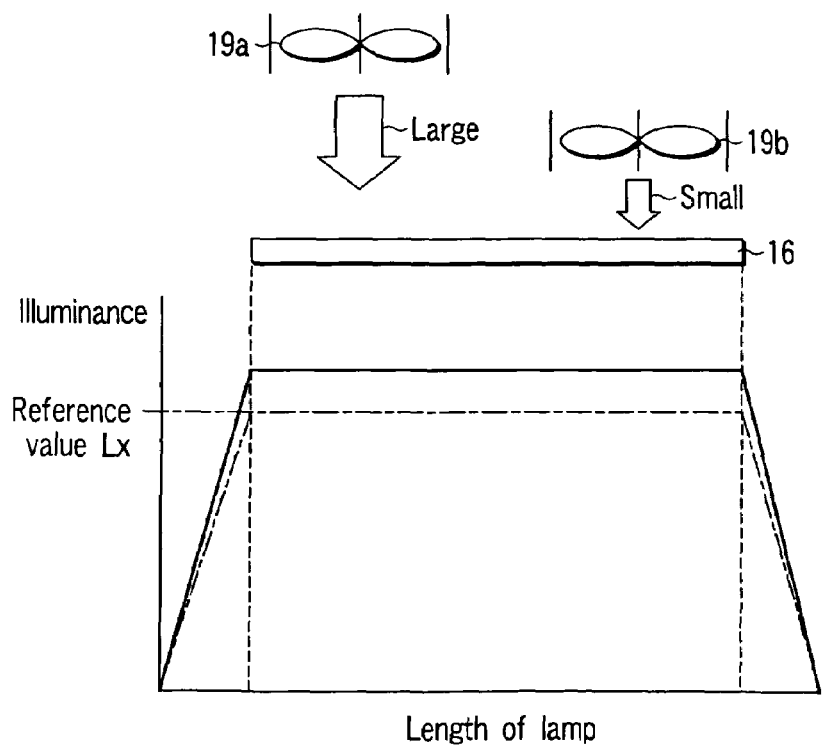

As stated above, even if the distance from the first and second cooling fans 19a and 19b to the illumination lamp 16 is not the same, the illuminance on the document table 11 is made substantially equal in all parts in the length direction of the illumination lamp 16, as shown in FIG. 7, at a level $L_2$ a little higher than the reference value Lx shown in FIGS. 4 and 5.

In other words, the illumination distribution on the document table 11 can be set to substantially equal, by setting the amount of the cooling wind provided from the fan located near to the lamp 16 smaller than that from the fan located far from the lamp 16, so that the degrees of cooling the lamp 16 by the two fans become substantially equal, as shown in FIG. 2B.

The positions of the cooling fans shown in FIG. 2B may be previously set, and can easily be set also by making at least one of the fans arranged as shown in FIG. 2A movable to a desired position manually or by a fan moving mechanism includes a not-shown moving guide and a moving unit or the like.

Further, since the cooling fans 19a and 19b are provided at the position or close to the position where the fluctuation in the light amount in the length direction of the illumination lamp 16, the fluctuation in the illumination distribution at the position on the document table 11 where the reading object O is illuminated, can also be suppressed to small. However, in many cases, the fan mountable position is controlled by the number of elements and wiring materials disposed in the scanner 101 or the construction cabinet, and a fan moving mechanism is not necessarily be provided.

As described above, in the scanner in which the illumination distribution on the document table 11 in the length direction of the lamp 16 is made uniform by supplying a predetermined amount of cooling wind from the first and second fans 19a and 19b, by the control of the scanner CPU 51, a predetermined value is instructed to the lamp lighting circuit 17, and the illumination lamp 16 is lit to be able to radiate a light with a predetermined intensity (light amount). When a not-shown control panel or an external unit instructs to read the image of the reading object O set on the document able 11, the lamp 16 may remain lighting (for the shading correction).

In the above-mentioned scanner 101, when the illumination lamp 16 radiates a light with a predetermined intensity, the elongate area of the reading object O placed on the document table 11 along the direction where the illumination lamp 16 is extended is illuminated, and the reflected light or the image light is sequentially reflected by the image take-out mirror 14a, the first mirror 15a and the second mirror 15b, and is guided to the lens 18. The image light guided to the lens 18 is given a predetermined image-forming magnification, and focused to the CCD sensor 12.

Thereafter, under the control of the scanner CPU 51, a predetermined value or the number of motor driving pulses (or a voltage) is applied to the motor driving circuit 52, and the driving motor 21 is driven at a predetermined speed. Therefore, the positions of the first and second carriages 14 and 15, to which the rotation of the driving motor 21 is transmitted through a not-shown driving force transmission mechanism, are continuously changed along the document table 11. Namely, the first and second carriages 14 and 15 are moved along the document table 11.

Thus, the position of the reading object O illuminated by the light from the illumination lamp 16 is sequentially changed along the document table 11, and the reflected light is sequentially focused to the CCD sensor 12. Therefore, the images of the reading object O in all areas on the document table 11 are guided to the CCD sensor 12.

The first and second cooling fans 19a and 19b are driven at predetermined speeds to be able to supply the cooling wind of a predetermined amount, when a predetermined value is instructed to the cooling fan driving circuit 53 while at least the illumination lamp 16 is lighting, that is, while the first and second carriages 14 and 15 are being reciprocated along the document table 11. The fans 19a and 19b can supply the cooling wind with a desired amount, according to the driving pulse or voltage supplied to the fan driving circuit 53.

Therefore, the document table 11 and illumination lamp 16 are cooled, and adhesion of dust to the document table 11, white reference marker 13, the mirrors 14a, 15a, 15b, and lens 18 can be prevented.

The image signal, whose image information of the reading object O outputted from the CCD sensor 12 has been read, is converted into a digital signal by the A/D converter circuit 72, corrected in the black and white levels by the shading correction circuit 73, and gamma corrected by the image processor circuit 74 to meet the image output characteristic of an image forming unit 103, and the noise component is eliminated.

After gamma corrected by the image processor circuit 74, the image signal is stored line by line in a work memory (or an image memory) or RAM 76 at a predetermined time interval through a shift register 75 (or a buffer memory), for example. A predetermined image processing is performed for the stored image signal, and the image processed signal is outputted as an image signal to an external memory or an external unit (a printer).

FIGS. 8A and 8B show another embodiment for cooling the illumination lamp in the scanner shown in FIG. 1.

As shown in FIG. 8A, a scanner 201 has a document table 11, a CCD sensor 12, an exposing unit (an illumination lamp) 16, a lamp lighting circuit 17, and at least one cooling fan 219, as in the scanner 101 explained before with reference to FIG. 1. The illumination lamp 16 and first carriage 14 are partially covered by a cover member 220, which prevents the cooling wind generated by the cooling fan 219 from applying directly to the lamp 16.

The cover member 220 is provided except the area where the illumination light from the illumination lamp 16 is blown toward the document table 11. Namely, the cover member 220 can be used in an optional form and structure, for example, it can be formed cylindrical with an opening formed by cutting out the part located between the illumination lamp 16 and document table 11. The cover member 220 can be made of a metal plate with high thermal conductivity, such as, a copper (Cu) and aluminum (Al).

As shown in FIG. 8A, by covering the illumination lamp 16 (and a part of the first carriage 14 which holds the lamp 16) by the cover member 220, it can be prevented that a specific area of the lamp 16 is extremely cooled. That is, by using the cover member 220, the cover member 220 is cooled, and the air around the lamp 16 is cooled. Thus, only a specific part in the length direction of the illumination lamp 16 is cooled, and variations in the light amount can be prevented. Further, as shown in FIG. 8A, by using the cover member 220 to temporarily cool the air around the lamp, only one cooling fan 219 is required.

FIG. 8B shows a modification example of providing the cover member shown in FIG. 8A. In this example, at least the illumination lamp 16 and lamp lighting circuit 17 are formed and sized to be covered by the cover member. Namely, in the example shown in FIG. 8B, the first carriage 14 is provided with the lamp lighting circuit 17 which functions as a heating source like a lamp, in addition to the illumination lamp 16. Thus, as to the heat radiated from the lamp lighting circuit 17, by cooling it simultaneously with the heat from the lamp 16, unevenness in the temperature around the lamp 16 can be prevented more efficiently than the example shown in FIG. 8A. Therefore, variations in the illumination light radiated from the lamp 16 are made smaller (decreased) than the example shown in FIG. 8A.

Figure 9:
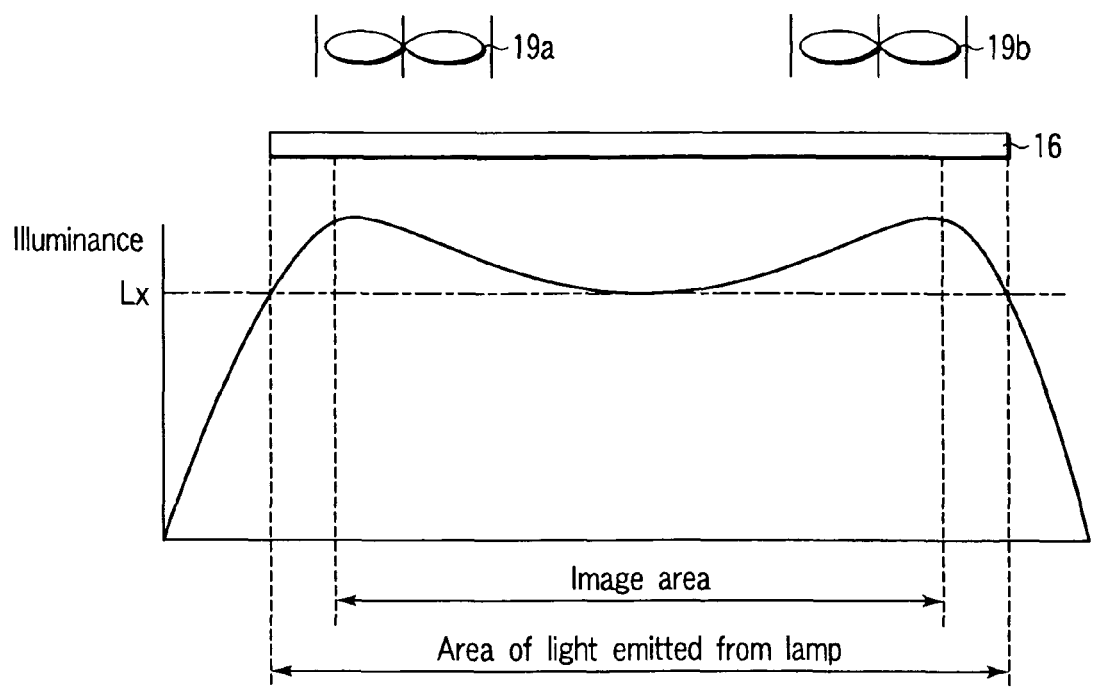
FIG. 9 is a view explaining still another embodiment for cooling the illumination lamp in the image reading apparatus shown in FIG. 1.
Figure 10:
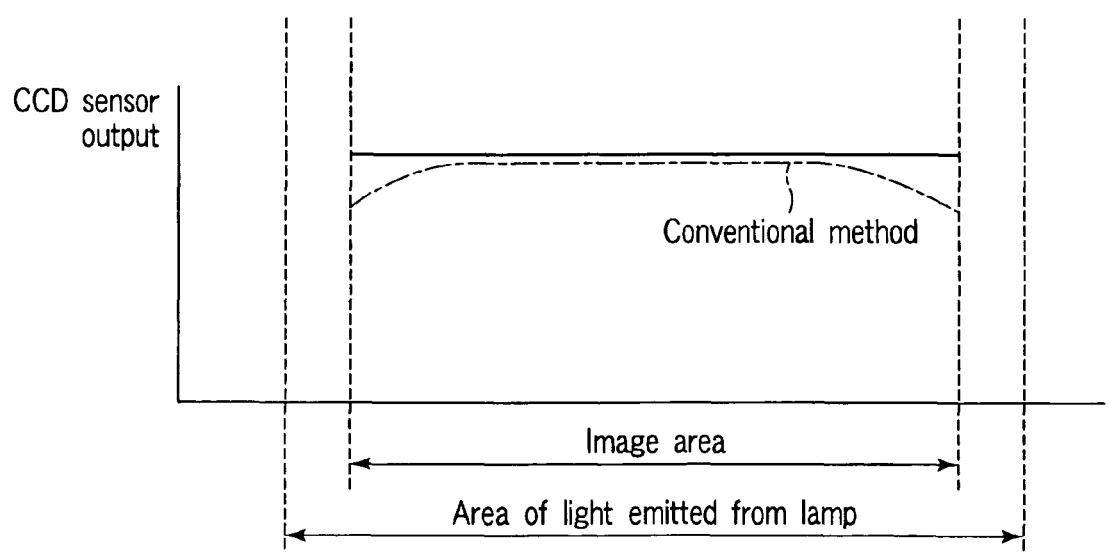
FIG. 10 is a view explaining an example of the output of a CCD sensor obtained as a result of the cooling shown in FIG. 9.
Figure 11:
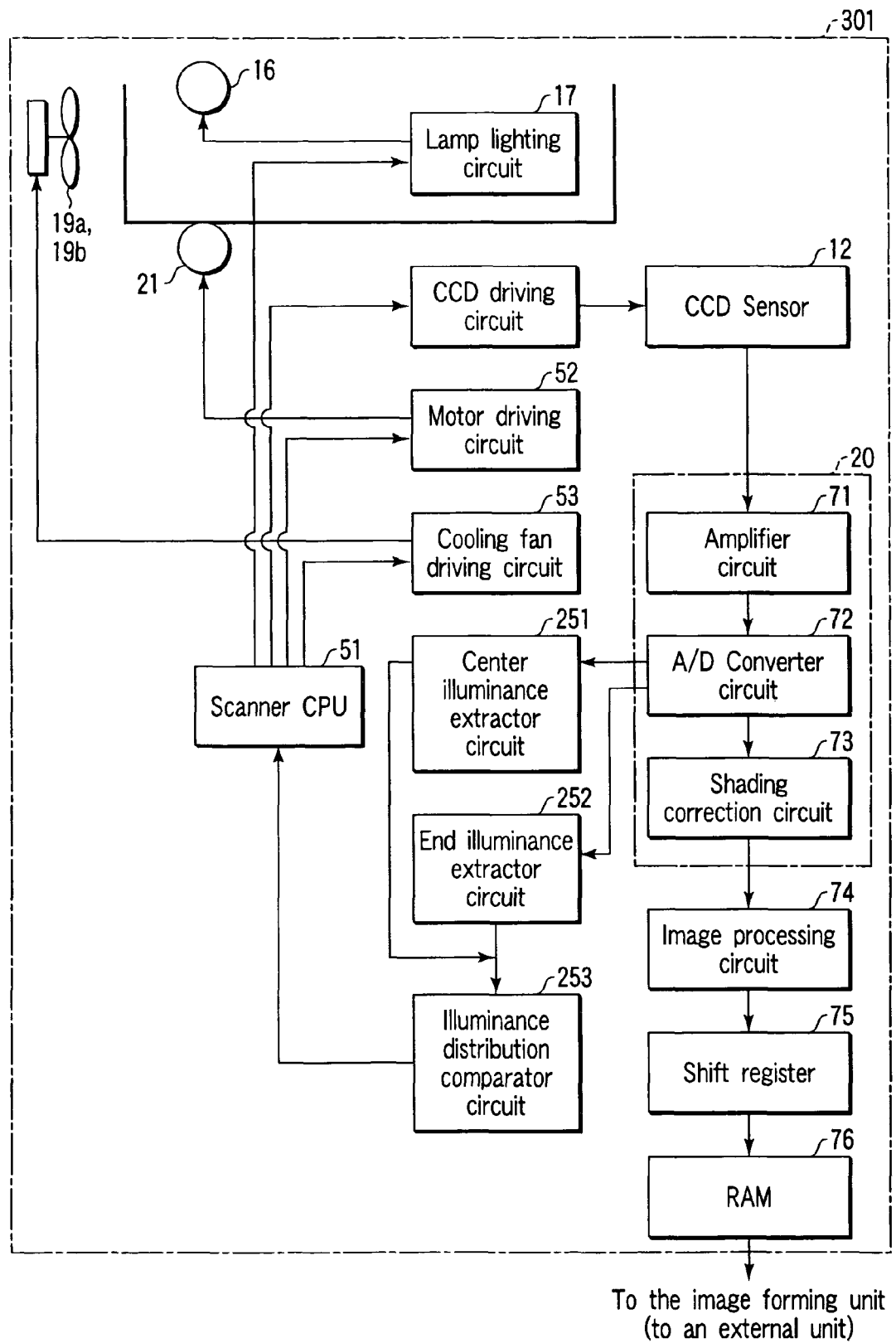
FIG. 11 is a block diagram explaining an example of a driving control system which can achieve the cooling shown in FIGS. 9 and 10.

FIG. 9 shows an example of another configuration for cooling the illumination lamp in the scanner shown in FIG. 1. FIG. 10 shows an example of the output of the CCD sensor obtained as a result of the cooling shown in FIG. 9. FIG. 11 shows a block diagram explaining the driving control system which can achieve the cooling shown in FIGS. 9 and 10. In the example explained with reference to the FIGS. 1, 2A, 2B, 3 to 7, the illumination lamp is cooled evenly in the total length, for the purpose of uniforming the light radiated from the illumination lamp in the length direction of the lamp.

However, in the system using the lens 18, as the distance from the center of the lens increases, the intensity of the light guided to the CCD sensor 12 is decreased, and there are many cases where the intensity of the light radiated from the illumination lamp 16 to the reading object O is increased at both ends of the lamp 16. Further, since the intensity of the light radiated from the lamp 16 is gradually decreased depending on the total time (the accumulated hours) of turning on the lamp, the thickness of the light-emitting body (phosphor) or the phosphor amount at both ends of the lamp is increased in many cases compared with the phosphor thickness (amount) at the part close to the center of the lamp.

It is seen from the above description the intensity of the light generated from the illumination lamp 16 changes (mostly, decreases) depending on the total time of turning on the illumination lamp 16. Therefore, when cooling the illumination lamp 16 by using the cooling fans 19a and 19b, if the total time since the initial turning on of the scanner 301 is insufficient, the light amount at the ends in the length direction of the lamp 16 is increased to be larger than the reference value, and the image information of the reading object O may be damaged. On the other hand, as the total time of turning on the lamp 16 increases, the base density of the image information at the positions corresponding to both ends of the lamp 16 increases, and the contrast may become dull compared with the image signal obtained from the part close to the center of the lamp.

Thus, in the scanner 301 shown in FIGS. 9 and 10, the image signal outputted from the CCD sensor 12 and converted into a digital signal by the A/D converter circuit 72, is applied to a center illuminance extractor circuit 251 and an end illuminance extractor circuit 252, where the illuminance at the part close to the center and ends of the lamp 16 is taken out, and the signal is applied to an illuminance distribution comparator circuit 253.

The illuminance distribution comparator circuit 253 outputs the value to indicate the difference between the illuminance at the part close to the center and ends of the lamp.

Thereafter, based on the instruction from the scanner CPU 51, a predetermined value (the number of rotation) is instructed independently to the cooling fan driving circuit 53, so that each of the fans 19a and 19b can be driven at predetermined speeds, that is, capable of supplying the cooling wind of a predetermined amount. Therefore, the ends of the illumination lamp 16 are cooled by respective fans 19a and 19b, so that the intensity of the light radiated from the ends of the illumination lamp 16 becomes to be the predetermined intensity.

As stated above, the intensity of the light radiated from the lamp 16, which changes depending on the accumulated turning on hour, is held at the predetermined intensity. In this case, as shown in FIG. 10, the intensity of the illumination light applied to the light receiving surface of the CCD sensor 12 to form an image, is held substantially equal at optional positions corresponding to all areas in the length direction of the lamp 16.

Namely, concerning the length direction of the CCD sensor 12, a homogeneous reading signal can be obtained in all areas in the length direction, without lowering the S/N ratio of the image signal outputted from an optional position. In this case, both ends of the illumination lamp 16 are cooled by the cooling fans 19a and 19b, respectively, so that the intensity of the light radiated from the illumination lamp 16 is increased within a range that the illumination of the illumination light on the document table 11 to be inputted to the CCD sensor 12 is not saturated. The amount of the cooling wind blown from the fans 19a and 19b to the illumination lamp 16 can be easily changed by setting the number of rotation of each fan or the motor driving current supplied to each fan, based on the output corresponding to the reflected light from the white reference marker 13, for example.

More particularly, when reading the reflected light from the white reference marker 13 for the shading correction, for example, the mean value of the 500 pixel outputs at the center and the mean value of the 500 pixel outputs at both ends, among the image signals outputted from the CCD sensor 12, are compared.

When the mean value of the pixel outputs at both ends is lower than the mean value of the pixel outputs at the center, the cooling fans 19a and 19b are rotated at a first predetermined speed, and both ends of the lamp 16 are cooled. Then, the means value of the 500 pixel outputs at the center is compared again with the mean value of the 500 pixel outputs at both ends.

When the mean value of the outputs at both ends is lower than the mean value of the outputs at the center, the driving current supplied to the fans is increased, and the cooling fans are rotated at a second predetermined speed faster than the first speed. Namely, both ends of the lamp 16 are further cooled.

As described above, cooling both ends of the lamp 16 and comparing the outputs at the center and both ends of the CCD sensor 12 are repeated until the output difference of the CCD sensor 12 comes in ±5%, and/or reaching a range of predetermined allowable number, thereby the output level of the CCD sensor 12 is made uniform in all areas in the length direction.

Further, the intensity of the light at both ends of the illumination lamp 16 is increased by adding the phosphor amount or changing the electrode form, and the lamp is more expensive than the lamp with flat orientation. By cooling both ends with cooling fans, the light intensity at both ends can be increased without increasing the cost.

As explained hereinbefore, according to the present invention, the flow of wind supplied by the cooling fans to cool the illumination lamp is optimized, and variations in the illuminance on the document table can be suppressed. Therefore, the picture quality of the reading image is improved.

Moreover, according to the present invention, when there is an intensity difference between the light radiated from both ends in the length direction of the lamp and the light radiated from the part close to the center of the lamp, owing to the structure of the illumination lamp, a homogeneous reading signal can be obtained all over the area in the length direction of the CCD sensor, without lowering the S/N ratio of the image signal outputted from an optional position.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image reading apparatus comprising:
   an illumination unit including a lamp to incorporate a change in temperature conditions to the emitting light amount, the lamp extending in a predetermined direction and having a predetermined length, the lamp illuminating a reading object to obtain the reflected light from the reading object;
   a first control unit which changes the capacity of the lamp of the illumination unit to illuminate the reading object;
   an image signal generation unit which generates an image signal by opto-electrically converting the reflected light;
   an optical unit which inputs the reflected light to the image signal generation unit;
   a second control unit which operates the image signal generation unit;
   a white reference marker which provides a reference for shading correction and illuminance of an illumination light to illuminate the reading object;
   an image processing unit which compensates a fluctuation in an image signal caused by any one of or all of the image signal generation unit, the illumination unit and the optical unit, and performs shading correction of the output of the image signal generation unit to set a reference for the output level of the image signal generation unit;
   a cooling unit which cools the lamp of the illumination unit;
   a third control unit which operates the cooling unit; and
   a control amount setting unit which sets the cooling amount when operating the cooling unit by the third control unit, and gives an instruction to the third control unit.

2. The image reading apparatus according to claim 1, wherein the cooling unit includes at least two fans, the fans provided at the positions satisfying the predetermined conditions concerning the length direction of the illumination unit; and each of the fans can be changed independently in the distance to the lamp and/or the number of revolution.

3. The image reading apparatus according to claim 2, further comprising an uniformalizing member which prevents the wind generated by the fan from applying directly to the lamp of the illumination unit.

4. The image reading apparatus according to claim 3, wherein the uniformalizing member is made of metal with high thermal conductivity.

5. The image reading apparatus according to claim 2, further comprising an uniformalizing member which prevents the wind generated by the fan from applying directly to the lamp of the illumination unit and the first control unit.

6. The image reading apparatus according to claim 5, wherein the uniformalizing member is made of metal with high thermal conductivity.

7. An image reading apparatus comprising:
   an illumination unit including a lamp to incorporate a change in temperature conditions to the emitting light amount, the lamp extending in a predetermined direction and having the distribution of the emitting light amount in the length direction, the lamp illuminating a reading object to obtain the reflected light from the reading object;
   a lamp lighting circuit which changes the capacity of the lamp of the illumination unit to illuminate the reading object;
   a line CCD sensor which generates an image signal by opto-electrically changing the reflected light;
   an optical unit which transmits the reflected light to the light receiving surface of the line CCD sensor;
   a CCD sensor driving unit which operates the line CCD sensor;
   a white reference marker which provides a reference for shading correction and illuminance of an illumination light to illuminate the reading object;
   an image processing unit which compensates a fluctuation in an image signal caused by any one of or all of the line CCD sensor, the illumination unit and the optical unit, and performs shading correction of the output of the line CCD sensor to set a reference for the output level of the line CCD sensor;
   a cooling fan which generates a cooling wind for cooling the lamp of the illumination unit;
   an illuminance comparing unit which compares the image signal outputted from both ends in the length direction of the line CCD sensor and the image signal outputted from the part close to the center in the length direction of the line CCD sensor, among the reflected lights obtained when the white reference marker is illuminated by the lamp, and sets the wind amount of the cooling wind to be outputted by the cooling fan;
   a motor driving unit which operates the cooling fan; and
   a control amount setting unit which sets a value to be instructed to the motor driving unit, to achieve the wind amount of the cooling wind to be outputted by the cooling fan.

8. The image reading apparatus according to claim 7, wherein the cooling fan is provided at least two at predetermined positions in the length direction of the lamp of the illumination unit, operable independently each other.

9. The image reading apparatus according to claim 8, wherein the control amount setting unit sets a value to be instructed to the motor driving unit to achieve the wind amount of the cooling wind to be outputted by the cooling fan, until the difference obtained by the illuminance comparing unit by comparing the outputs at the center in the length direction of the line CCD sensor and at both ends in the length direction of the line CCD sensor comes in ±5%.

* * * * *